Sept. 5, 1961     R. W. PETERSON     2,998,726
TANK SAMPLER
Filed March 13, 1959     2 Sheets-Sheet 1
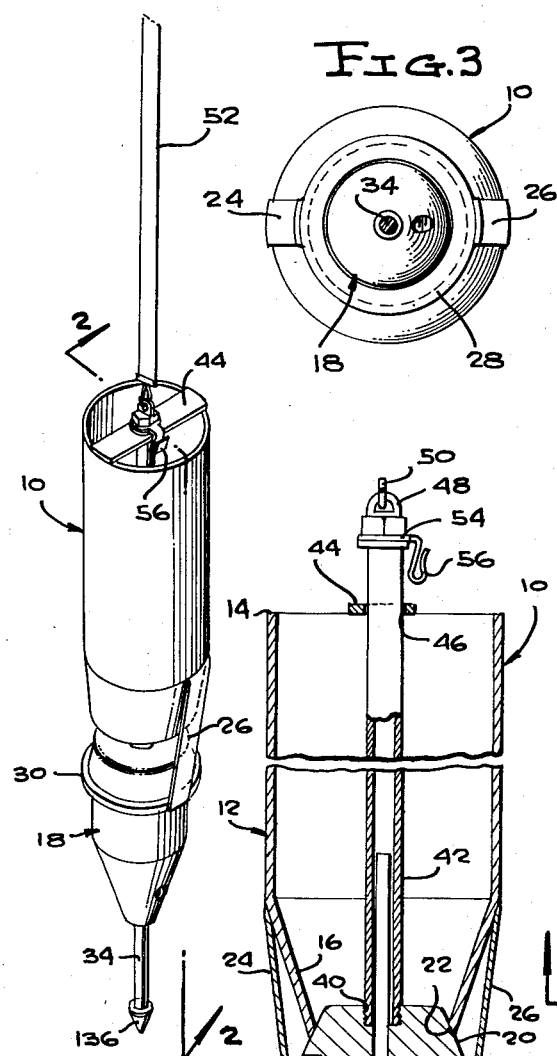
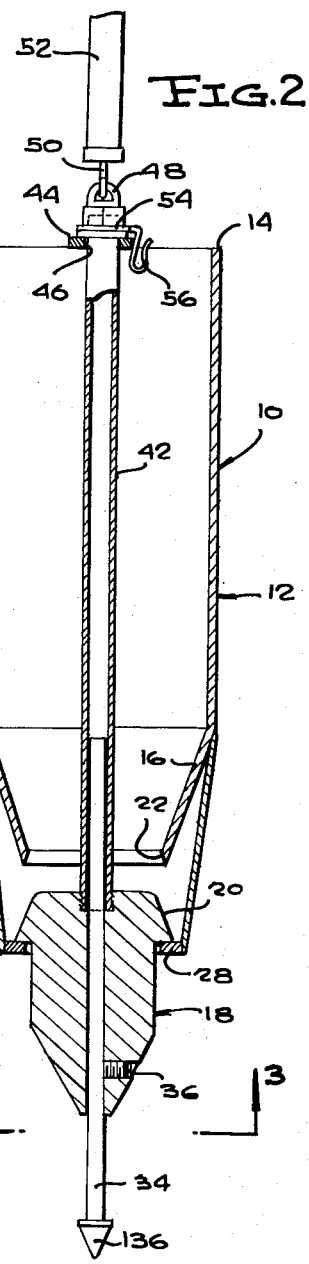
INVENTOR.
ROBERT W. PETERSON
BY
McMorrow, Berman + Davidson
ATTORNEYS

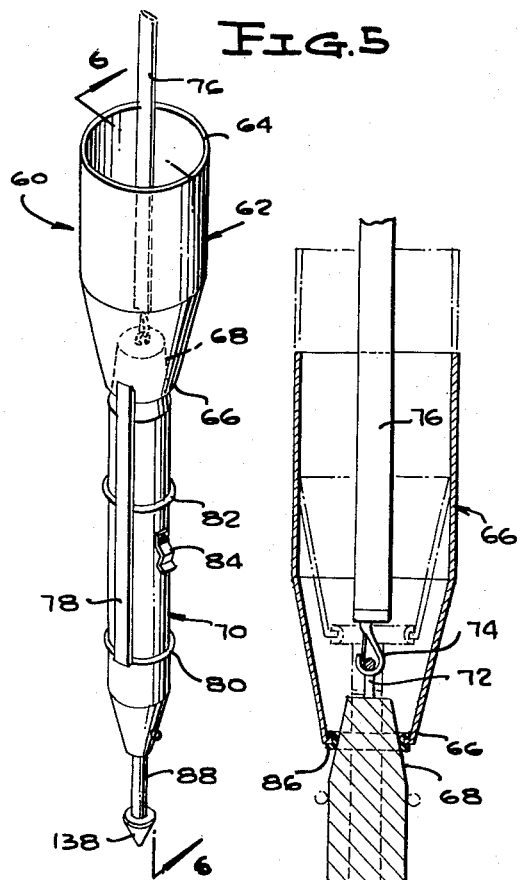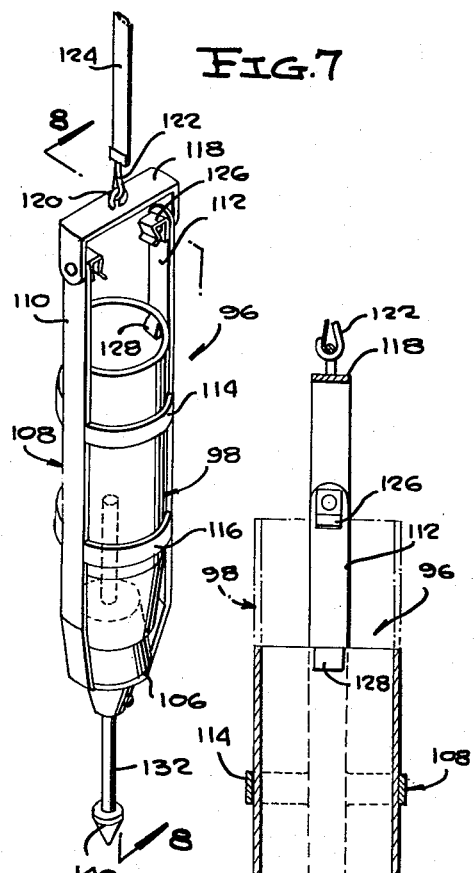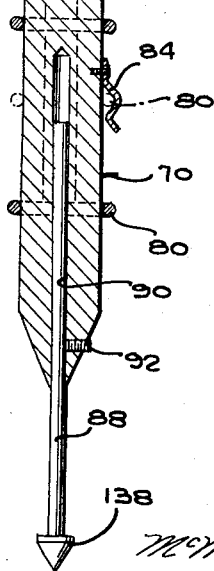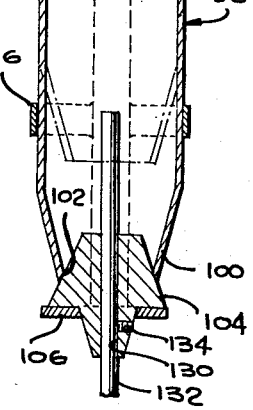

United States Patent Office 2,998,726
Patented Sept. 5, 1961

2,998,726
TANK SAMPLER
Robert W. Peterson, Box 152, Dix, Nebr., assignor of one-half to Dwain R. Madden, Dix, Nebr.
Filed Mar. 13, 1959, Ser. No. 799,291
5 Claims. (Cl. 73—425.4)

The present invention relates to a sampler used for taking a sample from a selected strata of liquid in a tank.

In the oil and chemical industries, various means have been used and others proposed for taking a sample from a selected strata of liquid in a tank. Such means have included cups and valve arrangements of varying complexity. Generally, the task of obtaining a sample from the tank is assigned to an individual, while a second individual, known as a gauger or gauge man, has the responsibility for gauging the depth of liquid in each tank. The gauger employs a graduated tape with a weighted end for gauging the depth of liquid in the tank. Each of the sampling devices in use or proposed is provided with a rope, cable, or chain for lowering the device into a tank of liquid to be sampled. After use, each sampling device and also the graduated tape used by the gauger must be wiped clean of liquid before re-use. The cleaning of the lowering rope or cable, as well as the cleaning of the graduated tape, is a tedious and annoying task.

An object of the present invention is to provide a tank sampler which lends itself to combining with the graduated tape employed by a gauger or gauge man.

Another object of the present invention is to provide a tank sampler which is light in weight, one positive in operation, and one which is highly efficient in action.

A further object of the present invention is to provide a tank sampler which is simple in structure, one sturdy in construction and having long-life characteristics, one having few moving parts, and one which is economically feasible.

These and other objects and advantages of the present invention will be fully apparent from the following description when taken in conjunction with the annexed drawings, in which:

FIGURE 1 is an isometric view of the tank sampler according to the present invention shown attached to a suspension means, a portion of the means being broken away;

FIGURE 2 is a view on an enlarged scale, taken on the line 2—2 of FIGURE 1, the sampler housing being shown in open condition;

FIGURE 3 is a view taken on the line 3—3 of FIGURE 2;

FIGURE 4 is a view similar to FIGURE 2, with the sampler housing in closed condition;

FIGURE 5 is an isometric view of a modified form of the invention;

FIGURE 6 is a view taken on the line 6—6 of FIGURE 5, the full lines showing the housing in closed condition and the dotted lines showing the housing in open condition;

FIGURE 7 is an isometric view of a further modified form of the present invention shown in closed condition; and FIGURE 8 is a view taken on the line 8—8 of FIGURE 7.

Referring in greater detail to the drawings, in which like numerals indicate like parts throughout the several views, in FIGURES 1 to 4, the reference numeral 10 designates generally the tank sampler according to the present invention. The sampler 10 comprises an upright housing 12 having an open upper end 14 and an open lower end 16. The lower end 16 of the housing 12 is shaped to the frustum of a hollow cone with the smaller end facing downwardly.

A plug valve 18, conformably shaped also to the frustum of a cone, is positioned so that the smaller end is adjacent to and in axial alignment with the smaller end of the housing cone, the cone portion of the plug 18 being designated by the numeral 20. The plug portion 20 is normally out of seating engagement with the lower end of the housing 12. A valve seat 22 is cut at an angle in the lower end of the housing 12 so as to seal the lower end of the housing 12 when the plug valve 18 has its portion 20 in seating engagement thereon.

The present invention provides suspension strap means exteriorly of the valve seat 22 and operatively connected to the housing 12 for supporting the plug valve 18. Specifically, this means consists in a pair of opposed straps 24 and 26 arranged in uprgiht directions and each having its upper end fixedly secured to the exterior of the housing 12 at a point where the cone portion of the housing 12 merges into the straight portion. Each strap 24 and 26 has its lower end fixedly secured by welding or other suitable means to the outer periphery of a ring 28 which is circumposed about the plug valve 18 and normally spaced below a shoulder 30 provided on the plug valve 18 at the lower end of the cone portion 20.

The plug valve 18 is provided with a vertical bore 32 slidably receiving a rod 34 extending actually through the valve 18. The portion of the rod 34 adjacent one end is below and exteriorly of the valve 18 and the portion adjacent the other end is above and exteriorly of the valve 18. The bore 32 constitutes guide means positioned axially of and carried by the valve 18 and slidably receives the portion of the rod 34 adjacent the upper end thereof. A set screw 36 mounted in the threaded bore 38 in the side of the plug valve 18 adjacent the lower end thereof fixes the rod 34 in any position of its adjusted movement upwardly or downwardly within the bore 32.

The upper end of the bore 32 is provided with a threaded counterbore 40 in which is threadedly engaged the threaded lower end portion of a tubular element 42 which has the portion adjacent its upper end above and exteriorly of the housing 12. The portion of the rod 34 adjacent its upper end slides in the tubular element 42.

A horizontally disposed strap member 44 extends across the upper open end 14 of the housing 12 and has its ends fixedly secured by welding or other suitable means to the housing 12. The strap member 44 is provided with an opening at its midlength point, as at 46 in FIGURES 2 and 4, through which extends the tubular element 42. As shown most clearly in FIGURE 4, the opening 46 is closer to one side of the strap member 44 than to the other, the purpose of which will be explained later.

Means is provided on the upper end of the housing 12 for lowering the housing 12 and the associated valve 18 into the liquid contents of a tank. This means consists in an eye formation 48 on the upper end of the tubular element 42. The snap hook 50 on the lower end portion of a gauging tape is detachably secured in the eye formation 48, the gauging tape being designated by the reference numeral 52 with only the lower end portion of the same illustrated.

A washer 54 below the eye formation 48 on the upper end of the tubular element 42 has a resilient lug 56 projecting from one side thereof. The lug 56 is U-shaped and projects downwardly below the upper end 14 of the housing 12 when the housing 12 is in the open or up position relative to the valve 18. One side of the strap member 44 is engaged under the lug 56 and the lug 56, with the strap member 44, constitutes releasable latch means operatively connected to the valve 18 for holding the valve 18 in the out of seating engagement position, as shown in FIGURE 2.

Referring to FIGURES 5 and 6, the reference numeral 60 designates the sampler of the present invention in a modified form. The sampler 60 has a housing 62 with an upper end 64 and a lower end 66. The portion of the housing 62 adjacent the lower end 66 is shaped to a frustum of a hollow cone with the smaller end facing downwardly. The valve in the present form of the invention is a frustum shaped portion 68 of a plumb bob 70 having an eye formation 72 on its upper end detachably engaged by the hook 74 on the lower end of a gauging tape 76.

An upright strap 78 is positioned exteriorly of the housing 62 and plumb bob 70 and has its upper ends secured by welding or other means to the lower end 66 of the housing 62. A horizontally disposed ring 80 is secured to the lower end of the strap 78 and another ring 82 is secured to the strap 78 intermediate the ends, the rings 80 and 82 being in alignment with each other and in alignment with the lower end 66 of the housing 62.

A downwardly opening resilient clip 84 is secured to the plumb bob 70 intermediate the ends thereof and releasably engages the lower ring 80 when the housing 62 is in the open position relative to the portion 68 of the plumb bob 70, as shown in dotted lines in FIGURE 6.

The ring 80 and clip 84 constitute releasable latch means operatively connected to the plumb bob 70 for holding the plumb bob portion 68 in the out of seating engagement position relative to the lower end 66 of the housing 62. A resilient gasket 86 is provided on the lower end of the housing 62 and constitutes a valve seat for the housing 62.

A rod 88 is slidable in a bore 90 extending vertically into the lower end portion of the plumb bob 70 and a set screw 92 secures the rod 88 in any position of its adjusted movement into or out of the plumb bob 70.

Referring to FIGURES 7 and 8, a still further modified form of the invention is shown in which the sampler is designated generally by the reference numeral 96. The sampler 96 includes a housing 98 having its lower end portion 100 shaped to the frustum of a cone and provided on its lower end with a valve seat 102. A plug valve 104 is positioned in axial alignment with respect to the housing 98 and has its upper portion also shaped to the frustum of a cone and is shown in seating engagement on the valve seat 102.

A ring 106 is snugly circumposed about the portion of the plug valve 104 below the cone-shaped portion and is carried on the lower end of a cage 108 which includes opposed straps 110 and 112.

The cage is provided with other rings 114 and 116 loosely circumposed about the housing 98 inwardly of each end of the latter.

An inverted U-shaped member 118 has the legs thereof pivotally connected to the upper end portions of the straps 110 and 112. The member 118 is provided with an eye formation 120 at its midpoint and on the upper side of the bight thereof for attachment thereto of the hook 122 of a gauge tape 124.

Resilient clips 126 are on the inner faces of the straps 110 and 112 and open downwardly to receive abutments 128 on opposed portions of the inner wall of the housing 98.

The ring 106, straps 110 and 112, and the rings 114 and 116 constitute means connecting the plug valve 104 to the housing 98 for movement into and out of seating engagement with the valve seat 102 on the housing 98.

The plug valve 104 is provided with a bore 130 extending vertically therethrough in which is slidably mounted a rod 132 with a set screw 134 provided in the side of the valve 104 for securing the rod 132 in any position of its adjusted upward or downward movement relative to the valve 104.

In each of the forms of the invention, the lower end portions of the rods 34, 88, and 132 are provided with point elements 136, 138, and 140, respectively, enabling the respective rod to penetrate the sludge in the bottom of an oil tank when the sampler of the present invention is employed to obtain a sample of oil from the tank.

In use, the sampler in each of its forms 10, 60, or 96, may be attached to the respective tape 52, 76, or 124, and lowered into a tank containing liquid from which a sample is to be taken. In each case, the housing 12, 62, or 98 is shifted upwardly to where the respective releasable latch means holds it in the up position relative to the respective valve 18, 68 or 104. Using the graduations on the tape to which the sampler 10, 60, or 96, is attached as an indicator of the depth to which the sampler has been lowered, the operator pays out the tape to the proper depth and with a sharp upward pull on the tape, releases the latch means embodied in the lug 56 and strap member 44, ring 80 and clip 84, or abutment 128 and clip 126. This permits the respective housing to move downwardly relative to the supporting tape to the position in which the lower end of the housing is closed, entrapping within the housing a sample of oil obtained at the desired strata within the tank.

The sampler 10, 60, 96, is then raised out of the tank and the sample of oil or other liquid removed therefrom. In the form of the invention shown in FIGURES 7 and 8, the interior of the housing 98 is made readily accessible to the operator by the swiveling movement of the member 118 relative to the straps 110 and 112 and the sample of oil contained within the particular housing 98 may be treated or observed as desired through the open top of the housing 98 without pouring of the oil or liquid therefrom.

In the use of either of the samplers 10, 60, or 96, the rods 34, 88, 132 are adjustably positioned with respect to their associated valves so that the bottom of the tank may be contacted through the sludge that may be therein when it is desired to take a sample of the fluid in the tank at a particular level relative to the tank bottom. Each of the aforesaid rods is adjustable relative to its valve so that the open end of the respective housing may be accurately positioned relative to the tank bottom for taking a sample at a desired space from the bottom of the tank.

What is claimed is:

1. In a tank sampler, an upright open ended housing, the lower end of said housing being shaped to a valve seat, a plug valve conformably shaped to fit within said seat positioned below and in axial alignment with said seat and normally out of seating engagement with said seat, a rod extending axially through said valve and having the portion adjacent the lower end below and exteriorly of said valve, suspension strap means embodying opposed straps exteriorly of said valve seat and operatively connected to said housing, a ring carried by said strap connecting said valve to said housing for movement of said valve from the aforesaid position to a position in seating engagement within said seat, and releasable latch means operatively connected to said valve for holding the valve in the out of seating engagement position.

2. In a tank sampler, an upright open ended housing, the lower end of said housing being shaped to the frustum of a hollow cone with the smaller end facing downwardly, a plug valve conformably shaped to a frustum of a cone positioned so that the smaller end is adjacent to and in axial alignment with the smaller end of said housing cone, the smaller end of said valve cone being normally out of seating engagement with the smaller end of said housing cone, a rod extending axially through said valve and having the portion adjacent the lower end below and exteriorly of said valve, suspension strap means embodying opposed straps exteriorly of said valve seat and operatively connected to said housing, a ring carried by said strap connecting said valve to said housing for movement of said valve from the aforesaid position to a position in which the smaller end of said valve cone is in seating engagement with the smaller end of said housing cone, and releasable latch means operatively connected to said valve for holding the valve in the out of seating engagement position.

3. In a tank sampler, an upright open ended housing, the lower end of said housing being shaped to a valve seat, suspension strap means exteriorly of said valve seat and operatively connected to said housing, a plug valve conformably shaped to fit within said seat positioned below and in axial alignment with said seat and normally supported on said suspension means out of seating engagement with said seat, a rod extending axially through said valve and having the portion adjacent the lower end below and exteriorly of said valve, suspension strap means embodying opposed straps exteriorly of said valve seat and operatively connected to said housing, a ring carried by said strap connecting said valve to said housing for movement of said valve from the aforesaid position to a position in seating engagement with said seat, and releasable latch means operatively connected to said valve for holding the valve in the out of seating engagement position.

4. In a tank sampler, an upright open ended housing, the lower end of said housing being shaped to a valve seat, suspension strap means embodying opposed straps exteriorly of said valve seat and operatively connected to said housing, a plug valve conformably shaped to fit within said seat positioned below and in axial alignment with said seat and normally supported on said suspension means out of seating engagement with said seat, a rod extending axially through said valve and having the portion adjacent the lower end below and exteriorly of said valve and having the portion adjacent the upper end above and exteriorly of said valve guide means positioned axially of and carried by said valve and slidably receiving the portion adjacent the upper end of said rod, suspension strap means embodying opposed straps exteriorly of said valve seat and operatively connected to said housing, a ring carried by said strap connecting said valve to said housing for movement of said valve from the aforesaid position to a position in seating engagement with said seat, and releasable latch means operatively connected to said valve for holding the valve in the out of seating engagement position.

5. A tank sampler comprising an upright open ended housing, the lower end of said housing being shaped to the frustum of a hollow cone with the smaller end facing downwardly, a plug valve conformably shaped to a frustum of a cone positioned so that the smaller end is adjacent to and in axial alignment with the smaller end of said housing cone, the smaller end of said valve cone being normally out of seating engagement with the smaller end of said housing cone, suspension strap means embodying opposed straps exteriorly of said valve seat and operatively connected to said housing, a rod extending axially through said valve and having the portion adjacent the lower end below and exteriorly of said valve and having the portion adjacent the upper end above and exteriorly of said valve, guide means embodying a vertically arranged bore in said valve slidably receiving the portion adjacent the upper end of said rod, a ring carried by said straps connecting said valve to said housing for movement from the aforesaid position to a position in which the smaller end of said valve cone is in seating engagement with the smaller end of said housing cone, releasable latch means operatively connected to said valve for holding the valve in the out of seating engagement position, and means on the upper end of said housing for lowering said housing into the liquid contents of a tank, said latch means being actuable to release position in response to the application of an upwardly directed sudden pulling force to said lowering means.

References Cited in the file of this patent
UNITED STATES PATENTS

| | | |
|---|---|---|
| 300,240 | Foat | June 10, 1884 |
| 1,064,420 | Barnes | June 10, 1913 |
| 1,887,859 | Pearce | Nov. 15, 1932 |

FOREIGN PATENTS

| | | |
|---|---|---|
| 290,758 | Great Britain | May 23, 1928 |